G. GORTON.
MEANS FOR INCREASING CUTTER EFFICIENCY.
APPLICATION FILED JAN. 18, 1915.
1,187,302.
Patented June 13, 1916.
2 SHEETS—SHEET 1.
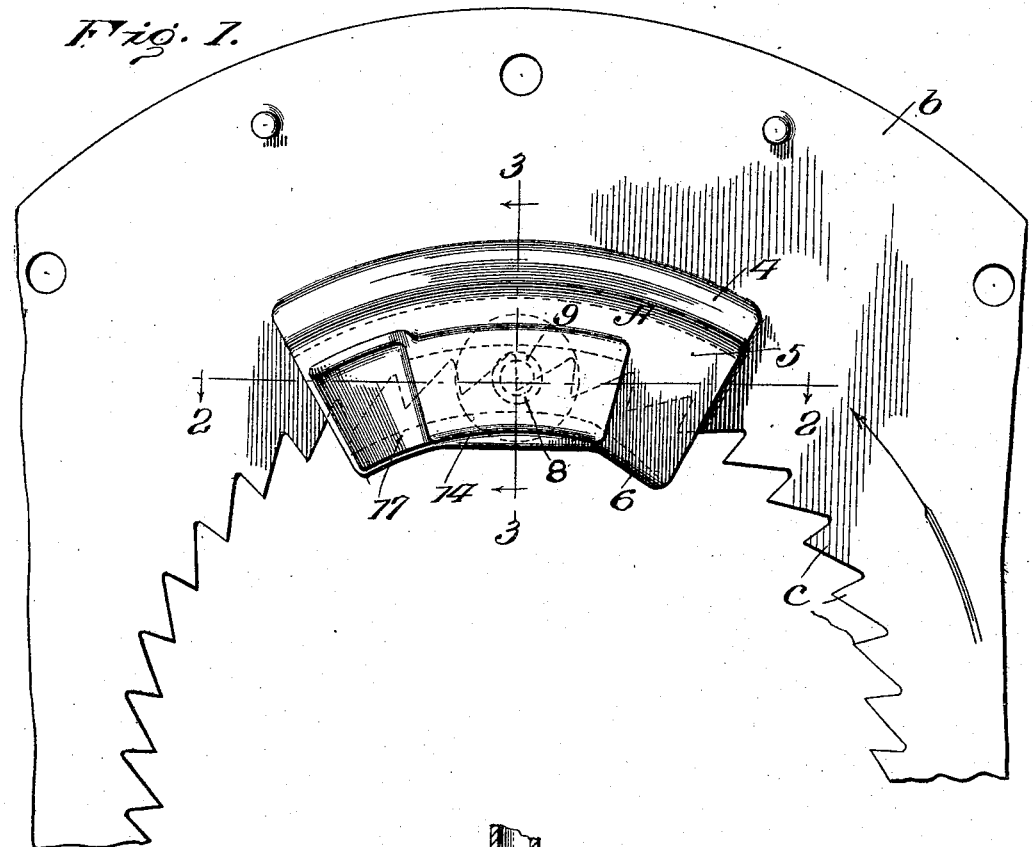
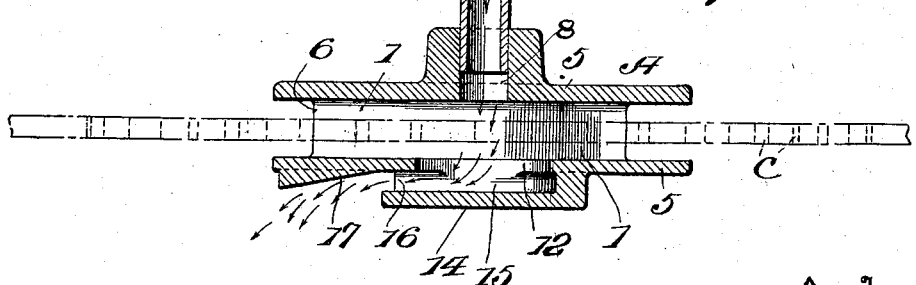
Witnesses
W. A. W. Williams.
E. R. Peck
Inventor
George Gorton
By Hubert Peck
Attorney G. GORTON.
MEANS FOR INCREASING CUTTER EFFICIENCY.
APPLICATION FILED JAN. 18, 1915.
1,187,302.
Patented June 13, 1916.
2 SHEETS—SHEET 2.
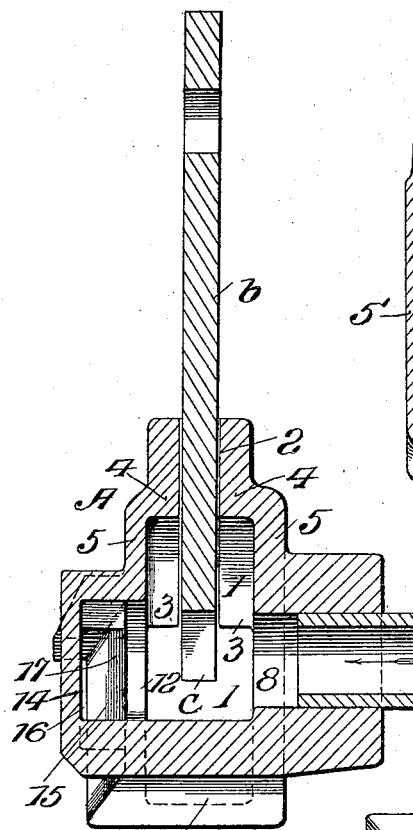
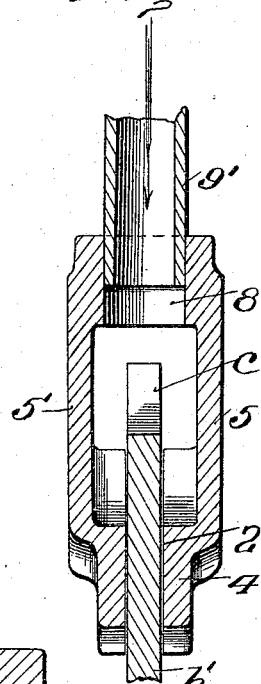
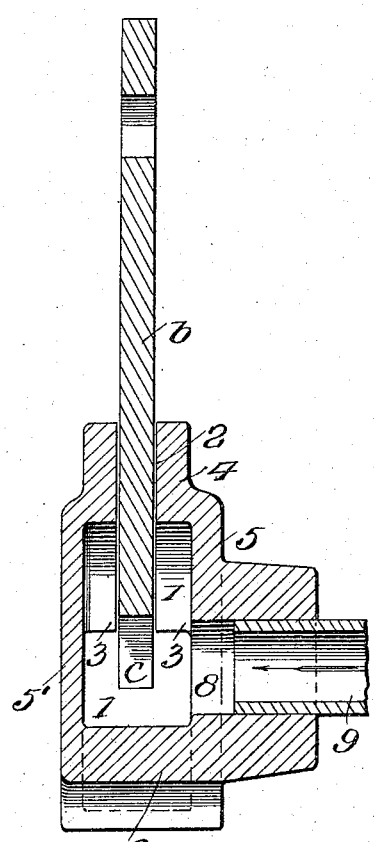
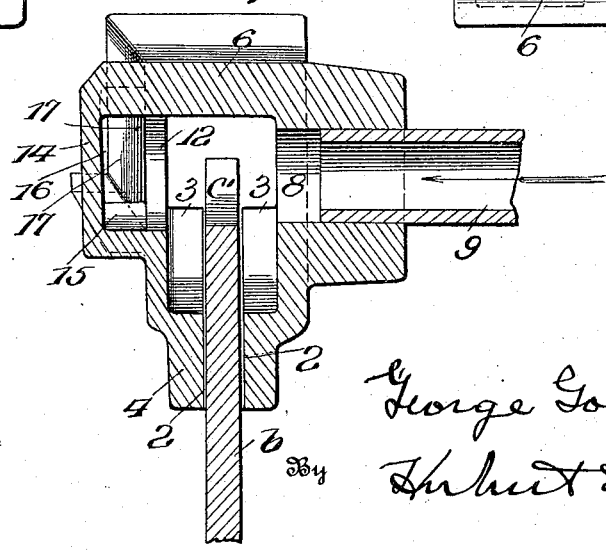
Witnesses
W. A. T. Williams
E. R. Peek
Inventor
George Gorton
By Hubert E. Peck
Attorney

UNITED STATES PATENT OFFICE.

GEORGE GORTON, OF RACINE, WISCONSIN.

MEANS FOR INCREASING CUTTER EFFICIENCY.

1,187,302. Specification of Letters Patent. Patented June 13, 1916.

Application filed January 18, 1915. Serial No. 2,910.

*To all whom it may concern:*

Be it known that I, GEORGE GORTON, a citizen of the United States, residing at Racine, in the county of Racine and State of Wisconsin, have invented certain new and useful Improvements in and Relating to Means for Increasing Cutter Efficiency, of which the following is a specification.

This invention involves improvements in and relating to means for increasing cutter efficiency; and the objects and nature of the invention will be readily understood by those skilled in the art in the light of the following explanation of the accompanying drawings illustrating what I now believe to be the preferred embodiment or mechanical expression of my invention from among other forms, arrangements, constructions and proportions within the spirit and scope thereof.

An object of the invention is to provide means for effectively keeping down or reducing the temperature of metal working cutters and the like, so that the working speed of such cutters and the speed of the table feed can be materially increased.

A further object of the invention is to provide means for maintaining a substantial arc of the working edge of a rotary cutter immersed in a body of cooling liquid that is under pressure or is constantly flowing, to absorb and carry off the heat of the working points of the cutter during the period of movement of such working points from and to the work.

A further object of the invention is to provide means for blowing, dislodging or discharging chips from the teeth or working points of rotary cutters and for cooling such teeth or cutters, by the application of a stream of constantly flowing cooling liquid under pressure.

A further object of the invention is to provide a cutter cooling water or other liquid box, hood or nozzle for application to rotary cutters, and formed to receive and maintain a substantial portion of such cutter immersed in or flooded with such liquid under pressure.

A further object of the invention is to provide a water or other cooling liquid hood or box formed to receive and cool a portion of a rotary cutter and cause the cooling liquid to blow or discharge chips from such cutter.

The invention consists in certain novel features in construction and in combinations and arrangements as more fully and particularly set forth and specified hereinafter.

Referring to the accompanying drawings; Figure 1, is a side elevation of means embodying my invention, applied to an internal rotary metal cutting saw or blade, a portion of said blade being somewhat diagrammatically shown. Fig. 2, is a section taken on the line 2—2, Fig. 1. Fig. 3, is a section taken on the line 3—3, Fig. 1. Fig. 4, is a sectional view of a modified form. Fig. 5, is a sectional view showing the hood or box of Fig. 1, formed for application to the working portion of a peripherally toothed rotary blade or cutter. Fig. 6, is a sectional view showing the device of Fig. 4, formed for application to the working portion of a peripherally toothed rotary blade or cutter.

The particular embodiment of my invention disclosed by the accompanying drawings comprises a longitudinally elongated hood, box or receptacle A, formed to provide an interior liquid chamber 1, having a water supply inlet, and a slot 2, opening through the end walls 3, of the hood or box and extending throughout the length of one longitudinal edge wall 4, to receive any suitable cutter blade $b$, so that the working cutters, teeth, or points $c$, thereof will travel within said chamber and throughout its length about midway between the side walls 5, of the box or hood and spaced a distance from the outer or opposite longitudinal edge wall 6, of the box.

In the forms disclosed by Figs. 1, 2, 3, 4, and 5, one side wall 5, of the box or hood is formed with the water inlet 8, opening laterally into the chamber 1, within the hood at a point about midway the length of the hood. This inlet can be tapped or threaded to receive the water supply pipe 9, by which the hood is usually supported in the desired position. The hood is usually longitudinally curved and elongated to produce a segment or arc shape usually of approximately the same radius as that of the working edge of the blade, although of course my invention is not so limited, and to receive and inclose a substantial length of said working edge of the blade. The hood incloses a substantial length of the working edge of the blade comprising a considerable number of cutters, teeth or working points so that each tooth passes through an arc of substantial length while inclosed within and passing through the water chamber within the hood. The hood or water box is of substantial radial depth and is approximately centrally and longitudinally slotted so as to slip a substantial distance onto or straddle the rotary blade with the longitudinal edges of the wall 4, at opposite sides of said slot approximately engaging the opposite side faces of the blade a substantial distance radially of the blade from the cutting or working points c, and with said points c, spaced a distance from the inner surface of the longitudinal wall 6.

The lateral water inlet into the hood or box is preferably so arranged that the working or cutting points c, successively pass across or opposite the inner end of said inlet so that the stream of water from the inlet shooting across the chamber 1, of the hood is successively interrupted by the passing cutting or working points. This stream thus serves as a means for dislodging chips from said cutting or working points while the water or other fluid in the elongated chamber 1, at both sides of the blade and surrounding the working points or cutters serves to cool said blade and working points and to effectively reduce the temperature of said working points by reason of the comparatively long time that each point is kept in contact with the liquid as well as because of the rapid flow and comparatively great volume of liquid that engages each working point while in the hood or box. The cooling liquid that constantly escapes from the slot of the hood or box, preferably keeps the work flooded and also the working points or cutters while performing the cutting operation.

I have discovered that cutters or working points can be kept so comparatively cool by a constantly flowing stream or comparatively large volume of flowing cooling liquid as to greatly enhance the efficiency of such cutters in the matter of cutter speed as well as in the matter of table or work feed and that consequently the amount of work performed by the cutters can be greatly increased.

The inlet opening 8, and the water supply pipe 9, are of comparatively large capacity and are usually coupled with a suitable pump by which a copious supply of water or other cooling liquid can be discharged into the hood or box at any suitable pressure. I have found it to be advantageous to supply the hood or box with cooling liquid under ten to fifteen pounds pressure per inch or even greater pressure, particularly where I desire to utilize the inrushing stream of liquid for blowing or discharging chips from the cutters or working points, although my invention is not so limited.

I have found it to be advantageous to provide means for separating the chips from the liquid that is allowed to discharge from the hood onto the cutters while at work or onto the portion of the work being cut. For instance, for the purpose of removing chips, I can provide an opening 12, through the wall 5 opposite the inlet 8, so that the cutters or working points will successively pass between the inlet 8, and the opening or side outlet 12, and the stream of water from the inlet 8, will shoot across the chamber 1, and through the outlet 12 as the spaces between the cutters move into position opposite the inlet and the chips will thereby be carried from the cutters out through the outlet 12, but nevertheless the volume of water entering through inlet 8, will be sufficient to keep the chamber 1, flooded and water discharging from the ends and slot 2, of said chamber. To prevent the liquid carrying the chips from squirting out through opening 12 onto the floor of the shop or otherwise in an objectionable manner, I preferably provide a deflector or housing over the outlet 12, with a side discharge opening and means to deflect the discharge laterally and thereby prevent the liquid carrying the chips from falling onto the lower portion of the blade or onto or into the cut. For instance, in certain figures of the drawings, I show the hood cast or otherwise formed integral with a longitudinal exterior hollow enlargement or bulge 14, on the side wall 5, that contains the outlet 12. This exterior enlargement 14, forms a discharge chamber or passage 15, extending rearwardly along said wall 5, and into the front end of which the outlet 12, opens laterally. The rear end of this passage terminates in the narrow vertical rearwardly opening discharge 16, while the rear portion of said wall 5, in rear of said discharge 16, is inclined rearwardly and outwardly to form a deflector 17, for directing the stream of liquid flowing from discharge 16, laterally from the hood and rotating blade so as to fall into any suitable receptacle (not shown) that can be arranged on the machine or the machine base to catch said liquid and screen the chips therefrom before the liquid is allowed to flow back into the tank from which the hereinbefore mentioned pump draws the supply of cooling liquid with which the hood is kept flooded.

In the constructions illustrated by Figs. 1, 2, 3 and 5, I show hoods formed with the chip separating and discharge means hereinbefore described, while in Figs. 4 and 6, I show hoods without said provision for separating the chips from the cooling liquid that flows from the hood and onto the blade and work.

Figs. 4 and 6, show the hood possibly in its most simple form wherein the liquid from the blade and cutter flooding chamber 1, discharges solely from the ends and longitudinal slot of said chamber and streams down along the blade and into the cut or kerf in the work. In this simple form of the hood, the wall 5', is imperforate or closed instead of having discharge 12, as in the other forms mentioned.

In Figs. 1, 2, 3 and 4, I show hoods, involving my invention, having the cutter blade receiving slot opening through their top longitudinal edge walls, so that the hoods can be inserted in the work-receiving opening of internal or center opening rotary cutter blades or saws $b$, and then moved upwardly to straddle the working edge $c$, and blade above said opening and above the work that extends through the opening. These center opening blades or saws are driven from their peripheries by being secured around their outer edges to a suitable rotary drum as will be readily understood by those skilled in the art.

In Figs. 5 and 6, I show hoods of my invention adapted to rotary milling or other saws, cutter blades, or the like, $b'$, having peripheral teeth, cutters, working points or edges $c'$, and adapted to be mounted on and driven by center arbors, or otherwise.

In the forms shown by Figs. 5 and 6, the blade receiving slots open through the bottom longitudinal edge walls of the hoods so that the hoods slip down on the top portions of the blades above those portions of the cutting edges that are operating on the work so that the work will be flooded as well as the blade by the stream of cooling liquid flowing from the hood.

In Fig. 6, I show the cooling liquid inlet 8' opening centrally through the top edge wall of the hood and receiving the vertical liquid supply and hood supporting pipe 9'. Even in the arrangement of Fig. 6, the flooding, flushing downward flow of the cooling liquid will exert a dislodging and removing influence on the chips carried by the milling or other cutter and in this instance the chips will be carried off usually through the ends of the hood. Sufficient clearance should be allowed between the side faces of the milling or other cutter and the end walls of the hood slot to permit discharge of the chips without wedging or locking between the cutter and the walls of the hood.

Whatever the construction of hood under my invention, the cooling liquid discharged therefrom is usually caught and screened and delivered into the tank or receptacle from which the hereinbefore mentioned pump draws the liquid to supply and flood the hood.

It is evident that various changes, modifications and variations both in the matters of form, construction, and proportions with respect to the cutter, can be resorted to without departing from the spirit and scope of my invention, and hence I do not wish to limit myself to the particular disclosures hereof.

Desiring to cover and protect my invention in the broadest manner legally possible, what I claim is:—

1. A metal cutter having a toothed or working edge, in combination with a hood having an opening through which the working portion of said cutter protrudes, said hood inclosing a substantial portion of the cutter and its working edge and forming a liquid cooling chamber in which said cutter and its working edge travels, and means for admitting a copious quantity of cooling liquid into said hood for maintaining a substantial portion of the cutter and its working edge in a torrent of heat absorbing liquid.

2. A rotary metal cutter having its annular working portion provided with cutters, in combination with means forming a cooling liquid chamber through which said working portion travels, and cooling liquid supply means for maintaining a substantial body of cooling liquid in said chamber in contact with said working portion traveling therethrough, substantially as described.

3. A rotary metal cutter having its annular working portion provided with cutters, in combination with means forming a cooling liquid chamber of substantial capacity through which said portion travels, said chamber having a cooling liquid outlet arranged to flood the work while being operated on by said working portion, and a cooling liquid supply pipe opening into said chamber, substantially as described.

4. A rotary metal cutter having its annular working edge provided with cutters, in combination with mechanism for directing a chip dislodging stream of cooling liquid against said cutters and for maintaining a substantial length of said working edge in contact with a copious quantity of flowing heat absorbing liquid, said mechanism embodying means for separating chips from a portion of said liquid.

5. A rotary metal cutter having its annular working edge provided with cutters, in combination with a hood forming an elongated cooling liquid chamber receiving a substantial length of the working edge of the upper portion of the cutter, said hood provided with means to supply a copious stream of heat absorbing liquid in said chamber.

6. A hood longitudinally slotted to receive a substantial length of the working edge of a rotary cutter and to form an elongated cooling liquid chamber through which said working edge travels, said hood provided with an inlet receiving a hood supporting pipe for supplying a copious flow of heat absorbing liquid into said chamber.

7. A hood longitudinally slotted from its under edge to receive a substantial length of the upper portion of the working edge of a rotary cutter and forming an elongated cooling liquid chamber through which said edge travels, said hood provided with means for supplying a copious stream of heat absorbing liquid into said chamber for maintaining said portion of said working edge in contact with a comparatively large quantity of said flowing liquid.

8. A longitudinally elongated hood longitudinally slotted to receive a rotary metal cutter and a substantial length of its working edge and forming an elongated cooling liquid chamber through which said edge travels and from which cooling liquid constantly flows in a stream downwardly on the cutter and onto the work, said hood provided with an inlet into said chamber to receive a copious stream of cooling liquid under pressure.

9. A hood slotted to receive a substantial portion of the working edge of a rotary cutter and to form a cooling liquid chamber through which said edge travels, said hood provided with means for maintaining said chamber flooded with a constantly flowing stream of cooling liquid in contact with the cutter.

10. A hood formed to receive a substantial portion of the working edge of a rotary cutter and provided with an inlet arranged to direct a chip dislodging stream against said working edge and with an outlet opposite said inlet for the discharge of liquid carrying the chips dislodged from the working edge.

11. A hood forming a cooling liquid chamber, said hood formed to receive a substantial portion of a rotary cutter blade and its working edge so that the working edge will travel through said liquid cooling chamber, said hood having an inlet for cooling liquid to keep said chamber flooded with a copious flowing stream of liquid, said inlet being arranged to direct a chip dislodging stream of liquid against said working edge, said hood having an outlet opposite said inlet for the discharge of liquid carrying the chips, said hood also formed with an offtake passage into which said outlet discharges and with a lateral deflector to throw the discharge from said passage laterally from the hood and the cutter blade.

12. A hood forming a fluid chamber through which the working edge of a rotary cutter is adapted to travel, and having an inlet arranged to discharge a chip dislodging stream of fluid against said edge as it travels through said chamber.

13. A hood formed to receive the working edge of a rotary cutter, said hood having a fluid outlet, and a fluid inlet arranged to discharge a chip dislodging stream of fluid against said edge as it travels through the hood.

14. A hood forming a cooling liquid chamber adapted to receive a substantial length of the working edge of a rotary cutter, said hood provided with a cooling liquid inlet arranged opposite and transversely of the working edge traveling through said chamber.

15. A hood formed to receive a substantial length of the working edge of a rotary cutter and providing a cooling liquid chamber through which said edge travels above the work and from which the liquid flows downwardly on the cutter to flood the portion of the work being cut.

In testimony whereof I affix my signature in presence of two witnesses.

GEORGE GORTON.

Witnesses:
C. R. CARPENTER,
C. ERLANDSON.

Copies of this patent may be obtained for five cents each, by addressing the "Commissioner of Patents, Washington, D. C."